(12) United States Patent
Gore et al.

(10) Patent No.: US 6,277,273 B1
(45) Date of Patent: Aug. 21, 2001

(54) FLOATING DECANTER FOR SUPERNATANT LIQUID

(75) Inventors: Douglas J. Gore, Pleasant Hill; Patrick Colahan, Martinez, both of CA (US)

(73) Assignee: U.S. Hydrex, Inc., Concord, CA (US)

( * ) Notice: Subject to any disclaimer, the term of this patent is extended or adjusted under 35 U.S.C. 154(b) by 0 days.

(21) Appl. No.: 09/602,608

(22) Filed: Jun. 21, 2000

Related U.S. Application Data

(60) Provisional application No. 60/140,498, filed on Jun. 22, 1999.

(51) Int. Cl.[7] ................................................ B01D 21/24
(52) U.S. Cl. ..................... 210/122; 210/242.1; 210/540
(58) Field of Search ........................... 210/122, 242.1, 210/532.1, 540, 776

(56) References Cited

U.S. PATENT DOCUMENTS

| | | | | |
|---|---|---|---|---|
| 3,970,556 | * | 7/1976 | Gore ................................... | 210/242.1 |
| 4,693,821 | * | 9/1987 | Goronszy et al. ................. | 210/242.1 |
| 4,695,376 | * | 9/1987 | Astrom et al. ....................... | 210/122 |
| 5,078,863 | * | 1/1992 | Durigon ............................. | 210/242.1 |

* cited by examiner

*Primary Examiner*—Christopher Upton
(74) *Attorney, Agent, or Firm*—Thomas M. Freiburger

(57) ABSTRACT

A floating decanter for removing supernatant from sequential batch reactors, clarifiers, or other similar devices. Sealed tanks support a central sump which has two peripheral openings which allow liquid to enter the sump and a cover to prevent splash over. A drain opening in the bottom of the sump allows liquid to drain out of the sump. Each of the peripheral openings has a hinged floating weir. Skirts around the drain opening in the bottom define the height of liquid in the sump upon which the floating weir rides. A barrier generally in front of and above the floating weir, prevents the surface of the liquid from entering the sump of the decanter. A horizontal plate positioned at the bottom of the sump provides a spoiler which discourages liquid from below the level of the sump from entering the sump. A plate, hinged where it joins the barrier above the weir, extends down to the lower lip of the sump. This plate generally seals the peripheral openings from intrusion of active sewage when the drain means is closed, and is pushed out of the way by the force of the liquid entering the sump when the drain means is turned on. This decanter causes a constant withdrawal rate of liquid supernate, while preventing the intake of scum and sludge during operation, and prevents sewage from entering the sump while dormant during the aeration or settling phase of a sequential batch reactor.

11 Claims, 6 Drawing Sheets

FLOATING DECANTER FOR SUPERNATANT LIQUID

This application claims the benefit of provisional application Serial No. 60/140,498, filed Jun. 22, 1999.

BACKGROUND OF THE INVENTION

This invention relates to the removal of the clear water layer which forms between a floating scum, and descending sludge layer in sequential batch reactors (SBR's), and similar devices. An SBR is a large tank with mixing and aerating means; it is filled with raw sewage during the fill cycle. The sewage is then vigorously aerated and mixed with appropriate chemicals during the aeration cycle (approximately 8 hours). After the aeration cycle, the tank is allowed to go into a quiescent period, a scum layer forms at the surface, and the heavier sludge begins to settle to the lower part of the tank. The clear liquid which is present between the scum and sludge is referred to as "supernatant", and is suitable for discharge. Without a decanter, it can take as much as 3 hours for the sludge to settle, and another 3 hours to decant the supernatant. This invention provides a means to exclude the raw sewage, sludge, and scum from entering the decanting mechanism, and yet provides a method of decanting the supernatant at a constant rate, thus removing uncontaminated supernatant as the sludge settles saving as much as 3 hours per SBR cycle.

SUMMARY OF THE INVENTION

The objectives of the current invention are to prevent the entry of sewage into the liquid withdrawal drain during the aeration, fill, and initial quiescent periods, while removing sludge- and scum-free supernatant during the decanting period of an SBR or equivalent. The control of the two modes with the present invention is accomplished by the opening and closing of the effluent valve on the SBR.

During the aeration, fill and early quiescent period, the effluent valve on the liquid removal piping is closed, and thus both the decanter and the piping will be filled with water and the fore, aft and central floats must have enough buoyancy to support the system while at rest. A sludge barrier at the flow opening has sufficient weight to sink and thus to block entry of sludge into the decanter, but it is sufficiently light to allow a modest current (0.5 MPH) to be able to push it inward, up and out of the way. A removable sump cover encloses the sump and prevents splash over from the aerated and agitated sewage. The floating weir which is hinged at its outboard end to the outboard end of the sump rises due to sufficient displacement in the weir float so as to form a secondary barrier substantially closing off the inlet to the sump thus preventing substantial amounts of raw sewage from entering the sump and effluent conduit. The displacement of the weir float adds to the general buoyancy of the float structure when the output valve is closed. A fixed plate traverses the area between the floats and extends downward so that it blocks a vertical area from the top of the float tanks, to a position approximately 4 inches below the water line. This plate forms a scum baffle which prevents floating scum from entering the sump.

A hinged plate serves as the sludge barrier, connected to and hanging from the scum baffle, extending to the outer edge of the hinged weir, and thus while the effluent valve is closed, it substantially closes off the opening which would allow liquid to enter the decanter. This plate is made of metal, or other suitable material with a specific gravity greater than that of water so that it will tend to sink in the absence of a supporting stream of water pushing the plate and entering the decanter. This plate becomes a barrier to sludge entering the decanter during the aeration phase. It is thus termed a sludge baffle or barrier. A closure mechanism assures that the sludge barrier will remain tightly closed as long as the effluent valve is closed.

A means of introducing clean water into the system between the decanter and the effluent control valve allows water to raise the elevation of the water in the decanter sump, such that any fluid transfer in the system would be the clean water in the sump being transferred into the SBR rather than the sewage entering the sump. The introduction of water is effective at low volumes because the elevated weir and the closed sludge barrier reduce the open area of the peripheral openings to a few square millimeters.

When the effluent valve on the SBR is opened after a short period of quiescence, water will begin to empty from the sump. As the sump level falls, the floating weir begins to lower as it is floating on the fluid in the sump. This creates a weir over which the supernatant begins to leave the SBR via the fluid conduit between the decanter head and the tank exit. The weir causes a rapid acceleration of water as it approaches the tip. This increase in velocity allows the prescribed amount of supernatant to enter the sump and the exit conduit while maintaining a very low velocity immediately outside the decanter thus minimizing the intake of either scum or sludge during the decant. When the flow begins to enter the sump, the sludge barrier closure mechanism is released and the barrier is deactivated. The vertical plate that traverses the area between the floats acts as an under-surface baffle which deters the entry of any floating scum. A horizontal plate which extends from the lower edge of the sump outward and to either side acts as a spoiler which minimizes any uptake of sludge into the decanter.

The volume of supernatant which leaves the SBR is controlled by amount of closure of the effluent up until the capacity of the weir to deliver supernatant is exceeded. If the capacity of the weir is exceeded, there is a possibility that the entire sump and effluent conduit will empty of water, and thus being so lightened, will elevate the decanter and further constrict the capacity of the weir to deliver supernatant. This out-of-control situation may cause the decanter to rise so high in the water as to skim in scum, or cease delivering supernatant entirely. To prevent this situation from happening, a secondary weir, fixed to the bottom of the sump, retains water in the sump at the precise level of the maximum delivery rate of the weir.

The maximum delivery rate is generally set by the SBR designers, and is generally between 1.8 and 3 cubic meters per minute for each meter of weir length. If the effluent valve is opened enough to exceed the capacity of the floating weir, the fixed weir will limit the floating weir to the specified delivery rate. A void space will form in the effluent conduit which will increase the positive flotation of the decanter, but because of the fixed weir, this increase in flotation will be limited to the conduit only, and the sump of the decanter will still retain the water and the weight of that water. As the conduit begins to empty, the decanter, and accordingly the base of the floating weir, will rise in relation to the water surface. This causes the weir to flatten, and increases the velocity of the water thus maintaining the prescribed delivery rate. This upward movement will be terminated when the loss of displacement from the rising flotation tanks equals the weight of the decanter head and the water retained in the sump by the fixed weir.

This arrangement of weirs and flotation will allow the decanter to deliver supernatant as the demand is increased by the effluent valve, and yet will maintain delivery at the maximum rate even though the effluent valve is opened past the specified decant rate.

DESCRIPTION OF THE PREFERRED EMBODIMENTS

Figure 3:
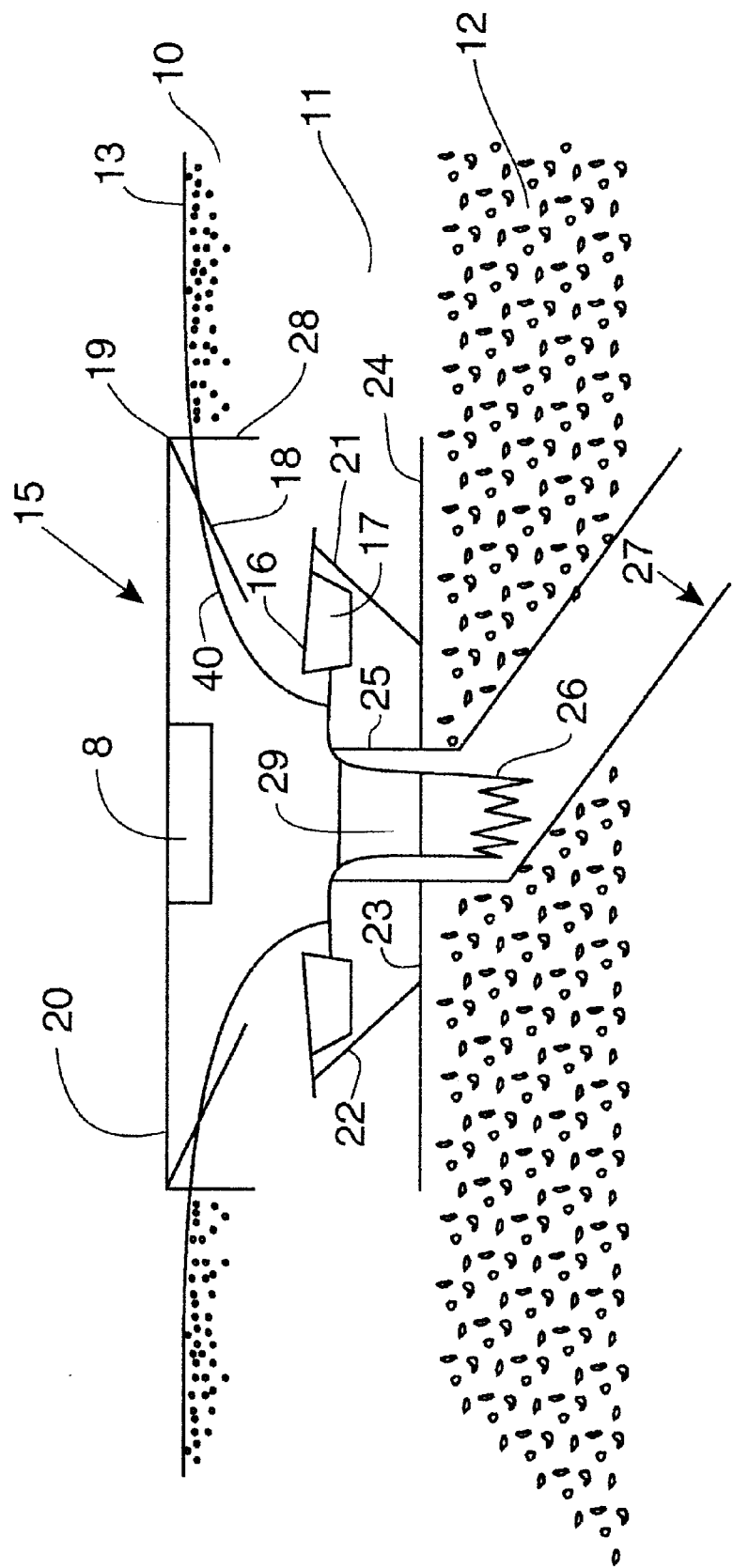
FIG. 3 is a schematic cross section drawn along the starboard to port axis equidistant on the fore to aft axis. The drawing is symmetrical and only one of each mirror image part is identified by number. The drawing shows the invention as representative of the decanter while it is removing fluid. The drawing also shows the relative liquid flows and layers during a decant cycle.
Figure 4:
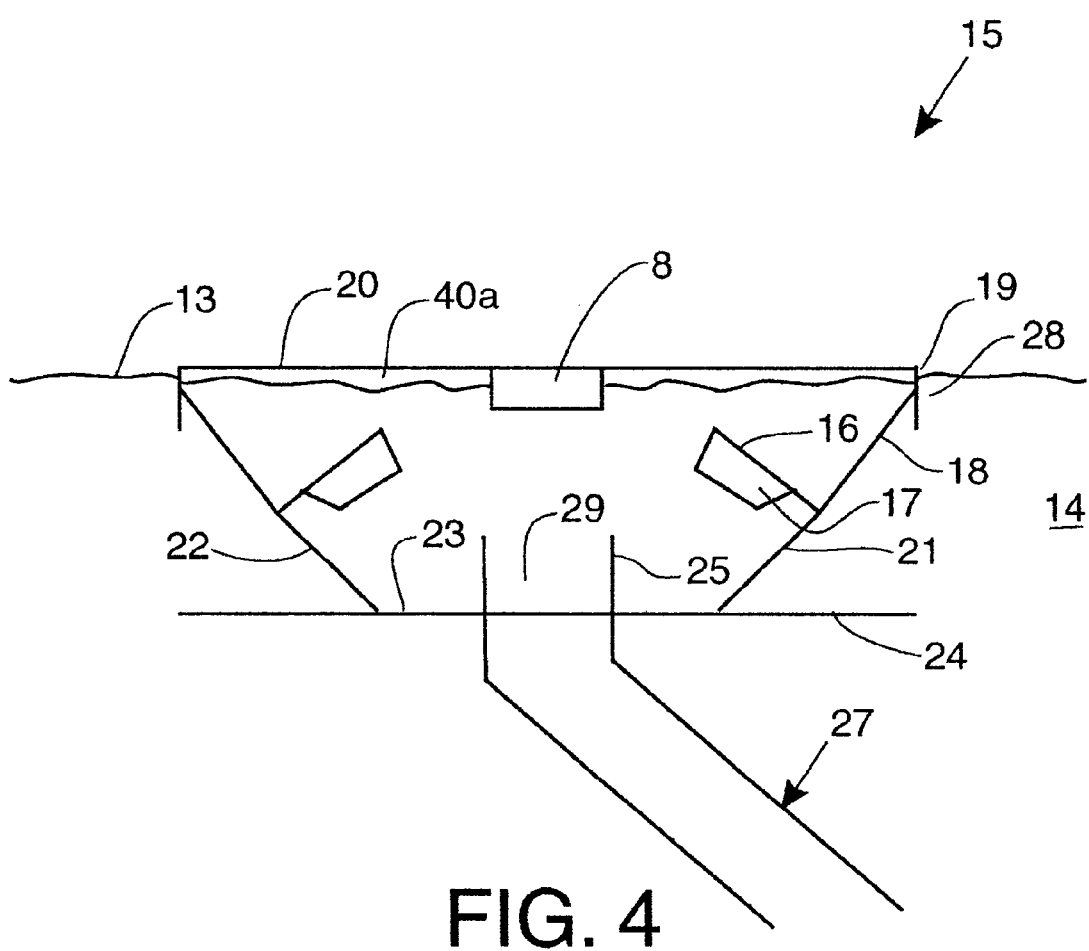
FIG. 4 is a schematic cross section drawn along the starboard to port axis equidistant on the fore to aft axis, showing the decanter as in the aeration phase, without conducting fluid.

As shown in FIG. 3, decanter 15 operates upon a body of liquid 13. In this illustration the body of liquid has three constituents: a floating layer 10 generally referred to as "scum", a central layer 11, referred to as "supernatant" and a layer 12 which has a sinking material referred to as "sludge". In other embodiments or applications, layers may be formed by other constituents. Plate 20 comprises the top of the decanter, and prevents any splash-over of liquid from entering into the sump. The sump is formed in part by a side plate 22 which extends front to back from float to float. The bottom of the sump is formed by plate 23 which has a fluid exit means or drain 29. Plates 25 form the fixed weirs or secondary weirs which retain the fluid level in the sump providing the lowest limit to which the weir float 17 will allow the weir 16 to fall in relation to the outer liquid level 13. The weir 16 is hinged at the front of the sump wall plate 22, by hinge 21. Fluid conduit 29 connects with an appropriate piping system 27 to conduct fluid out of the decanter tank and subsequently out of the reactor tank. Sludge baffle 18 is a pivotal plate which extends from front to back of the sump, and is hinged to the top of a scum baffle 28, or to adjacent structure above or below, bearing against the sump plate 22 when closed (FIG. 4). The sludge baffle 18 rises up and out of the way because of the force of the flow of liquid which enters the decanter 15 as the fluid exits from exit means 29. A fixed scum baffle 28 extends from above the fluid level 13 down to a short distance below the fluid level (approximately 3 to 5 inches in this embodiment) and prevents the scum layer 10 from entering the decanter 15. A spoiler 24, a horizontal plate which extends from side to side under the main body of the decanter, prevents the descending sludge 12 from being sucked into the decanter. An optional central float 8 extends from side to side and as the flow exits the decanter 15, acts as ballast counteracting the void area which forms at the fluid conduit 29.

As shown in FIG. 4, the sump of the decanter 15 in the dormant state is formed by top cover plate 20, sludge baffle or barrier 18, sump plate or side plate 22 and bottom plate 23. The fluid exit conduit 29 is de-activated by an external valve which restricts flow through fluid conduit 27. The central float 8 extends from side to side across the sump and provides flotation on liquid level 13 when fluid is not flowing through the decanter. The sludge barrier 18 is hinged by hinge device 19 and tends to fall down by its weight to contact the top of the weir 16 (or fixed structure adjacent to the weir hinge 21), thus preventing the solids 14 from the aeration process from entering the decanter. The floating weir 16 rises on float 17, and thus acts as a further barrier to the solids in liquid 14 from entering the decanter 15. The spoiler 24 prevents sludge from being sucked into the inflow.

Figure 5:
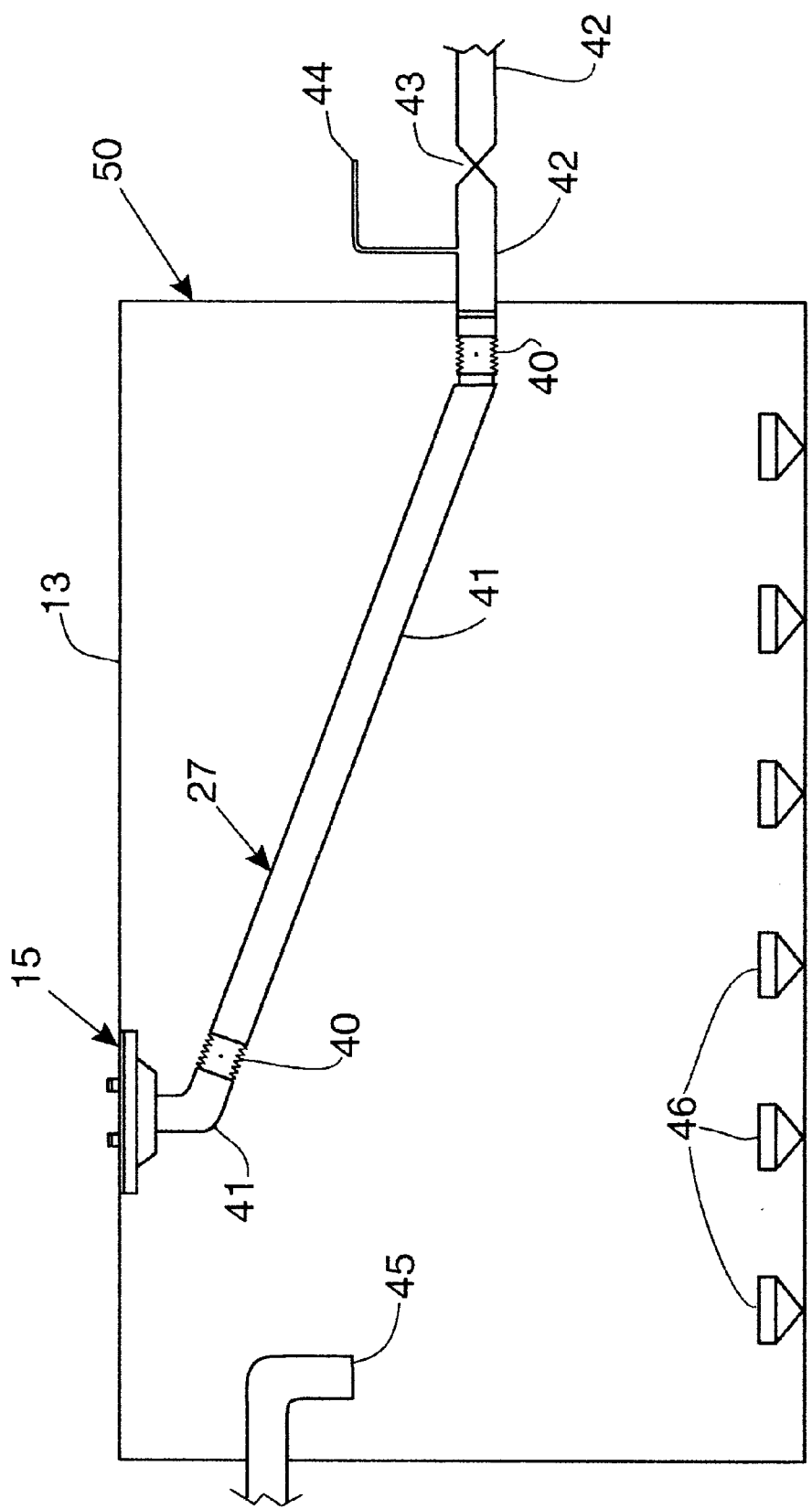
FIG. 5 is a cross sectional representation of the decanter head in relation to a typical sequential batch reactor, including fluid exit means and control valve.

As shown in FIG. 5, the decanter 15 floats on the liquid surface 13 of sequential batch reactor tank 50. Tank 50 has a fill means 45 and aeration means 46. Other appropriate reactors and methods are considered as applicable to this invention. Decanter 15 has sufficient flotation to support itself, the fluid conduit 41 and suitable articulation means 40. Fluid withdrawal continues through tank 50 via external piping 42 to a control valve 43. A water inlet 44 supplies clean water into the system which flows up into the decanter 15 when valve 43 is closed, thus providing a positive liquid head inside the decanter 15 which will cause any leakage to go from decanter 15 into the general fluid in the tank delineated by the liquid/scum surface 13.

Figure 1:
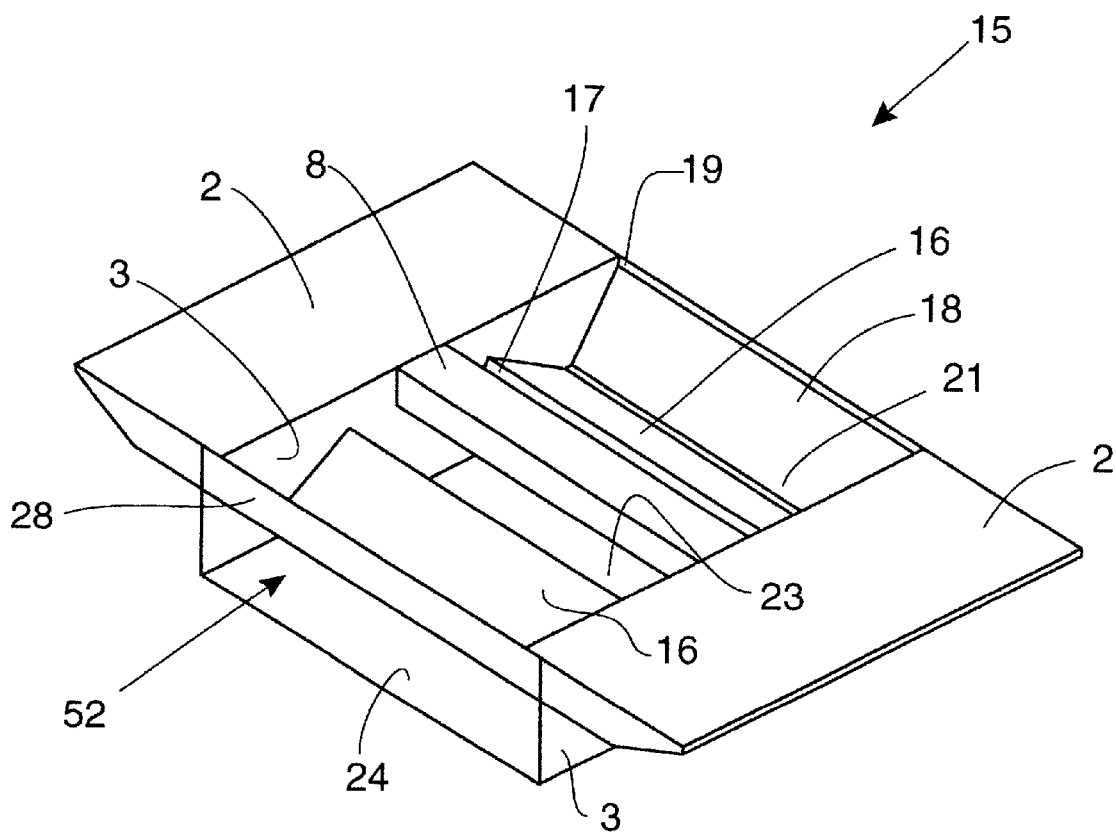
FIG. 1 is an isometric view of the decanter as it would appear without fluid flowing through it.

In FIG. 1, the decanter 15 is shown as comprised of fore and aft floats 2 which, preferably with a central float 8, support the sump structure. The top cover 20 is not shown in FIG. 1. The sump structure is comprised of front and back walls 3, scum barrier 28, floor 23 and sludge barrier 18. The decanter 15 has a liquid entry means 52 defined by sump front and back walls 3, spoiler 24 and scum barrier 28. Sludge barrier 18 is attached to scum barrier 28 by hinge device 19 and closes off the fluid entry means 52 when the decanter is closed off. Floating weir 16 is attached to the sump by a hinge mechanism 21.

Figure 2:
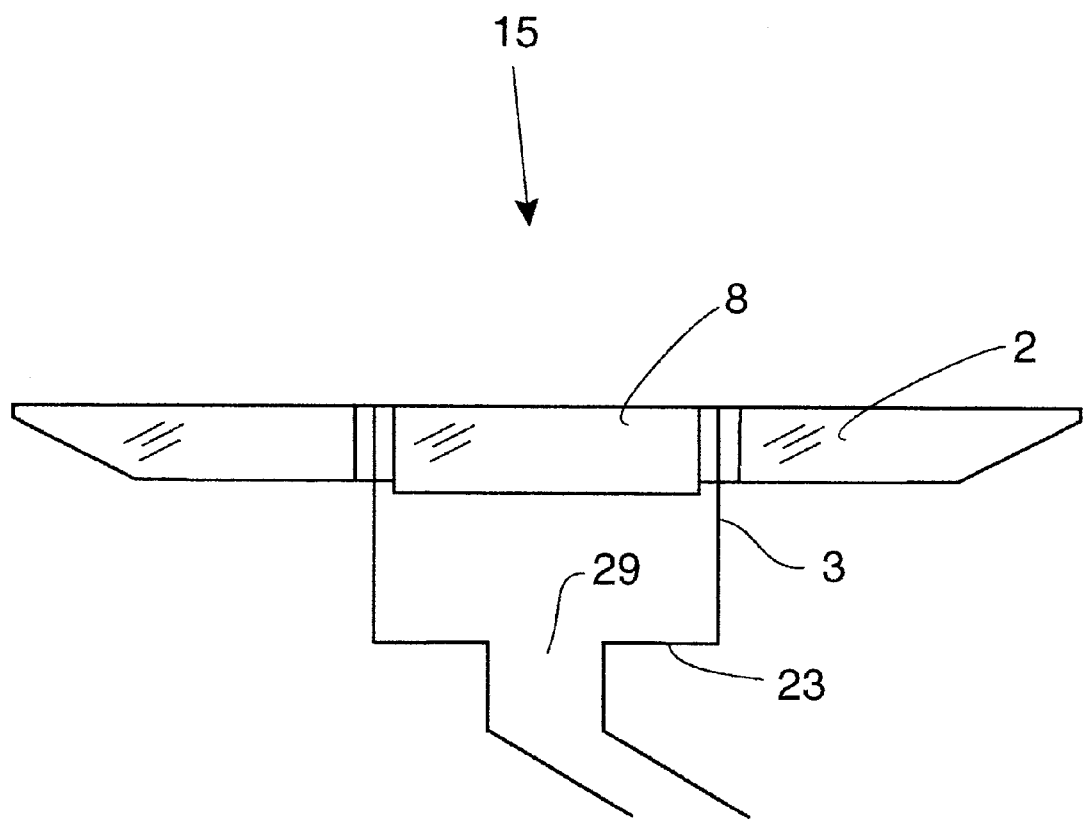
FIG. 2 is a schematic cross section drawn along the forward to aft axis equidistant on the starboard to port axis. The drawing is symmetrical and only one of each of the mirror image parts is identified by number.

FIG. 2 shows that the decanter 15 is supported in the water by fore and aft floats 2 and central float 8 which connect to the sump walls 3. The decanter sump is further defined by the bottom 23, and the fluid exit means 29.

Figure 6:
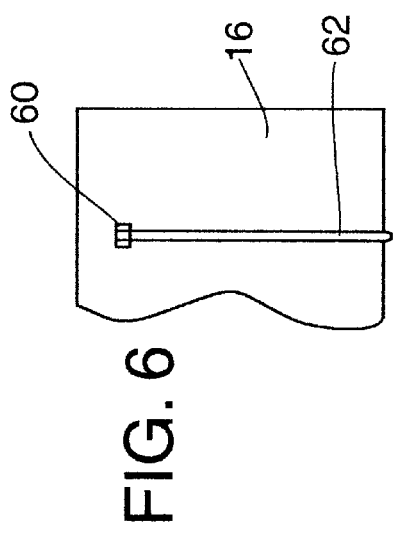
FIG. 6 is a partial plan view showing a sludge barrier closure mechanism.

FIGS. 6, 7A, 7B and 7C show a sludge barrier locking device which assures a positive and dependable closure of the sludge barrier when the decanter outlet is closed. In FIG. 6 a part of the weir 16 is shown, with a hinge 60 by which it attached a closure rod 62 for the sludge barrier.

Figure 7A:
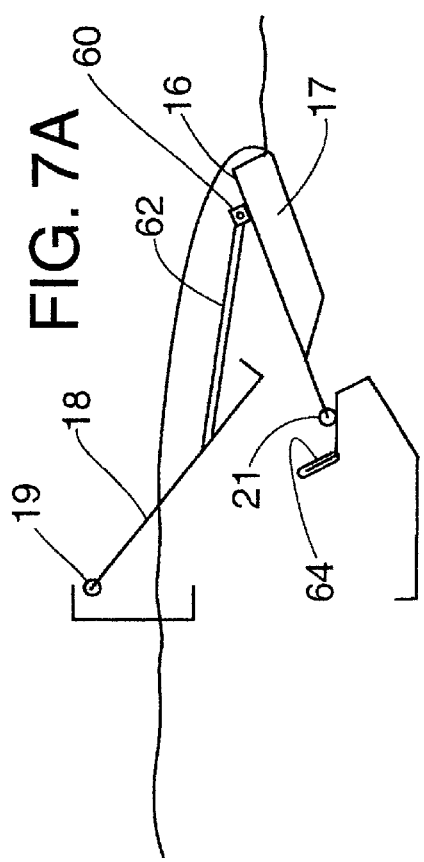
FIGS. 7A, 7B and 7C are schematic partial elevation views of the decanter, showing the sludge barrier closure device and its operation, in three phases.
Figure 7C:
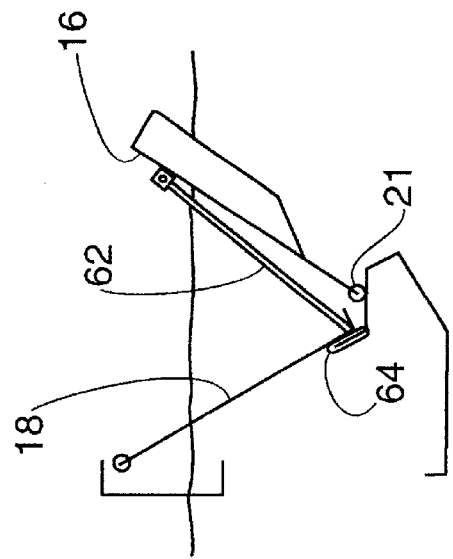
Figure 7B:
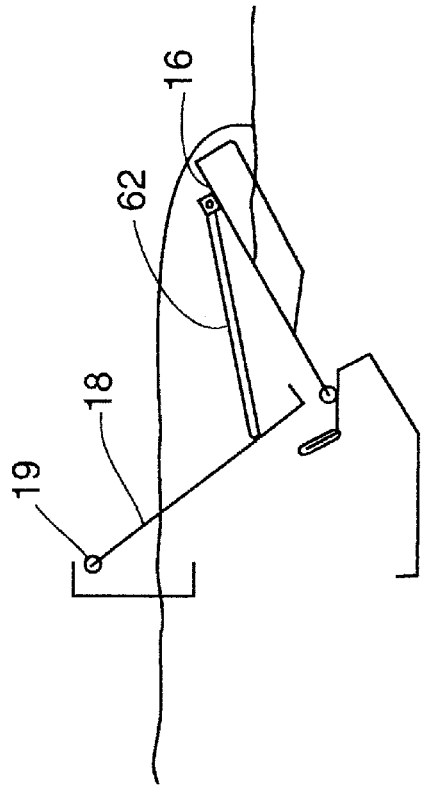

FIGS. 7A, 7B and 7C show that the rigid closure rod 62 bears against the inside surface of the sludge barrier plate 18. FIG. 7A shows the condition of the decanter with the liquid output fully open. The weir float 17 floating in the liquid in the sump of the decanter, hinged at hinge 21 establishes the weir 16 as shown, with the rod 62 freely articulating on its hinge 60 and the sludge barrier 18 open and remaining in that condition due to the inflow of liquid. Thus, the rod 62 presents no significant barrier to the sludge barrier 18 from its articulation on the hinge 19, and a full flow of liquid is allowed into the decanter.

FIG. 7B shows the decanter condition as the liquid outlet of the system begins to close, or conversely, when the outlet is opened after having been closed. As closure of the outlet occurs, the liquid level in the sump rises, and the weir 16 rises with the sump level. The sludge barrier 18 pivots downwardly under its own weight as velocity drops. As the sludge baffle 18 moves downwardly toward the closure position, the rod 62 continues to bear against the plate 18 and, as can be seen from FIG. 7B, the rising weir tends to engage the rod against the sludge baffle 18. Conversely, when the liquid outlet of the system is opening instead of closing, the situation in FIG. 7B is that the weir moves to the right, away from the sludge barrier 18, thus allowing the barrier 18 to become free to rotate about its hinge 19, allowing supernatant to enter the decanter.

FIG. 7C represents the condition of the decanter with the liquid outlet of the system closed, thus submerging the skimmer sump. The weir 16 on its hinge 21 is at a maximum upwardly inclined position as shown, with the rod 62 engaged against a lower end of the sludge barrier plate 18, thus holding firmly against a gasket 64 serving as a closure stop for the sludge barrier. The pressure of the weir floating in the sump is converted to a downward pressure on the rod 62, so that it presses down on the lower end of the sludge barrier 18 sufficiently to provide a positive closure. An alternative, simpler form of sludge barrier lock would be a fixed bracket or flange (not shown) on the weir 16, near the hinge, to engage against the closed sludge barrier 18, although this would not provide as positive a closure holding force.

The above described preferred embodiments are intended to illustrate the principles of the invention, but not to limit its scope. Other embodiments and variations to this preferred embodiment will be apparent to those skilled in the art and may be made without departing from the spirit and scope of the invention.

We claim:

1. A floatable decanter for removing supernatant liquid from a sewage treatment tank in which a period of agitation or aeration is followed by quiescent period during which scum usually forms at the surface at the liquid and sludge particles settle toward the bottom of the tank, comprising:

a decanter body, at least one fixed float in the decanter body, sufficient to float the decanter even when substantially filled with liquid, an internal liquid sump in the decanter body, a liquid entry port in the decanter body, positioned to receive supernatant liquid into the decanter body and into the sump, a liquid outlet in the sump of the decanter, and conduit means for removing liquid flowing into the liquid outlet, at least one weir positioned between the liquid entry port and the liquid outlet, over which inflowing liquid flows and accelerates to reach the liquid outlet, a sludge barrier having open and closed positions effective to admit supernatant liquid through the liquid entry port when opened and to close the liquid entry port when closed, with means for opening the sludge barrier when liquid is being withdrawn out of the sump through the liquid withdrawal conduit, and a scum barrier on the decanter body, positioned to be adjacent to the surface of liquid in the tank and to prevent scum at or near the surface of the liquid in the tank from entering the liquid entry port.

2. The apparatus of claim 1, further including means preventing the decanter body from floating up in the surrounding tank liquid beyond a preselected degree when liquid is withdrawn through the withdrawal conduit at a more rapid rate than the rate of liquid entering the liquid entry port.

3. The apparatus of claim 2, wherein the means preventing floating up of the skimmer body comprises a barrier surrounding the liquid outlet and establishing a minimum depth of liquid within the sump, thereby establishing a minimum weight of the skimmer body and limiting upward flotation.

4. The apparatus of claim 1, wherein the scum barrier comprises an elongated wall on the decanter body, the wall having a bottom edge which defines the upper limit of the liquid entry port, and the wall having a height which is taller than a preselected depth of scum which can be encountered in the sewage treatment tank, the upper edge of the wall being positioned to be above the surface of the liquid in the tank and the lower edge of the wall positioned to be below the bottom of the scum layer when the decanter is floating within such a sewage treatment tank.

5. The apparatus of claim 1, wherein the sludge barrier comprises a pivotally mounted plate on the decanter body, with a hinge at its upper side and being openable inwardly on the hinge, positioned such that the weight of the sludge barrier tends to move the sludge barrier to the closed position, whereby the force of liquid entering the liquid entry port as liquid is withdrawn through the outlet conduit will move the sludge barrier to the opened position.

6. The apparatus of claim 1, wherein the weir comprises a pivoted, floating weir having a weir float positioned to float in the sump liquid and having a pivot connecting the floating weir to the decanter body, and further having a weir tip positioned at the downstream end of the floating weir relative to the incoming liquid from the liquid entry port, whereby incoming liquid to the decanter body enters at a slow speed and accelerates in a skimming action over the tip of the floating weir as it cascades into the sump.

7. The apparatus of claim 6, further including a fixed, secondary weir surrounding the liquid outlet in the decanter body, maintaining liquid in the sump at a minimum level fixed by the height of the secondary weir, thereby establishing a minimum weight for the floating decanter body and preventing the decanter body from floating upward in the surrounding tank liquid beyond a predetermined level, even when liquid is withdrawn at a rapid rate through the liquid outlet.

8. The apparatus of claim 6, further including sludge barrier locking means connected to the floating weir and positioned to engage against the sludge barrier when the barrier is closed, with an attachment on the floating weir positioned to engage the closed sludge barrier as the floating weir pivots upwardly as liquid rises within the decanter body.

9. The apparatus of claim 8, wherein the sludge barrier locking means includes a rod pivotally secured to the upper side of the pivoted, floating weir and having a free end contacting against the sludge barrier, a lower end of the sludge barrier when closed coming to rest against a closure stop secured to the decanter body and closely adjacent to the weir pivot, and the rod being of such length that, with the sludge barrier closed, the rod pivots down to a point where the free end of the rod engages against the lower end of the sludge barrier, and, as the floating weir rises, the free end of the rod engages tightly against the bottom end of the sludge barrier to lock it in place.

10. The apparatus of claim 1, wherein the weir is positioned and is of such height in the decanter body and relative to the sump as to accelerate incoming liquid which has entered through the liquid entry port, as the liquid flows over the tip of the weir into the sump, whereby liquid entering the liquid entry port enters at a slow speed, so as not to draw into the decanter scum or sludge, but then accelerates inside the decanter body en route to the liquid outlet.

11. The apparatus of claim 1, wherein the decanter is generally symmetrical and has two such liquid entry ports at opposed positions in the decanter body, with the sump and the liquid outlet between the entry ports, and including two such weirs at opposed positions and two such sludge barriers at opposed positions.

* * * * *